United States Patent [19]

Couchoud

[11] 4,039,634

[45] Aug. 2, 1977

[54] SHAPED ARTICLES MADE FROM A MIXTURE OF POLYVINYLIDENE FLUORIDE AND A COPOLYMER OF METHYL METHACRYLATE AND A COMONOMER CONTAINING A QUATERNARY AMMONIUM GROUP

[75] Inventor: Paul Couchoud, Dardilly, France

[73] Assignee: Rhone-Poulenc-Textile, Paris, France

[21] Appl. No.: 567,873

[22] Filed: Apr. 14, 1975

[30] Foreign Application Priority Data

Apr. 16, 1974 France .................................. 74.13449

[51] Int. Cl.$^2$ ....................... C08L 27/12; C08L 39/04
[52] U.S. Cl. ............................... 260/895; 260/79.3 M;
260/900; 264/210 F; 526/292
[58] Field of Search ................... 260/895, 900, 86.1 N,
260/79.3 M; 264/184, 205, 210; 526/292

[56] References Cited

U.S. PATENT DOCUMENTS

| | | | |
|---|---|---|---|
| 3,340,222 | 9/1967 | Fang ..................................... | 260/900 |
| 3,361,843 | 1/1968 | Miller et al. ......................... | 260/895 |
| 3,941,860 | 3/1976 | Couchoud et al. .................. | 260/900 |

*Primary Examiner*—J. Ziegler
*Attorney, Agent, or Firm*—Stevens, Davis, Miller & Mosher

[57] ABSTRACT

The invention relates to shaped structures, e.g., filaments, fibers or films based on poly(vinylidene fluoride) possessing good dyeing affinity for acid and metal-containing dyestuffs and comprising a fiber and filament forming mixture of poly(vinylidene fluoride) and a copolymer containing 80–95% by weight of methyl methacrylate and 5–20% by weight of a compound which contains a quaternary ammonium group and is copolymerizable with methyl methacrylate.

The filaments and fibers according to the invention can advantageously be used in the textile field.

8 Claims, No Drawings

SHAPED ARTICLES MADE FROM A MIXTURE OF POLYVINYLIDENE FLUORIDE AND A COPOLYMER OF METHYL METHACRYLATE AND A COMONOMER CONTAINING A QUATERNARY AMMONIUM GROUP

The invention relates to shaped articles, e.g., fibers, filaments and self supporting films based on poly(vinylidene fluoride) which possess good affinity for metal-containing and metl-containing dyestuffs.

The invention also relates to a process for the preparation of the said fibers, filaments or films from mixtures of poly(vinylidene fluoride) and a copolymer which provides the dyeing affinity for acid and metal-containing dyestuffs.

It is already known from U.S. Pat. No. 3,692,569 to improve the wettability and the dyeing affinity or fluorinated polymers by surface activation of the polymers by applying to them a coating of a copolymer or fluorethylene and a fluorinated vinyl compound containing a sulphonyl group.

However, such a process is technically very complicated and consequently of low profitability.

Filaments, fibers and films based on poly(vinylidene fluoride) which possess good dyeing affinity for acid and metal-containing dyestuffs have now been found, and it is this which forms the subject of the present invention, these filaments, fibers and films being characterised in that they comprise a mixture of a vinylidene fluoride homopolymer (A) and a copolymer (B) containing 80 to 95% by weight of methyl methacrylate and 5 to 20% by weight of a compound which contains a quaternary ammonium group and is copolymerisable with methyl methacrylate. The copolymer preferably contains 8 to 15% by weight of the compound possessing a quaternary ammonium group.

The invention also relates to a process for the preparation of said filaments by wet, dry or semi-melt spinning of a composition comprising the mixture of vinylidene fluoride homopolymer (A) and the copolymer (B) containing 80–95% of methyl methacrylate and 5 to 20% of a compound which is copolymerisable therewith and which possesses a quaternary ammonium group, stretching the filaments in one or more stages, washing and drying them and optionally heat-treating them in a known manner.

According to the present invention, the vinylidene fluoride homopolymer used is a polymer with a melt flow index at 250° C of at least 10 and preferably of between 100 and 5,000. It represents the amount in mg of polymer extruded in one minute through a nozzle of diameter 2 mm under a load of 10 kg/cm².

The copolymers of methyl methacrylate which can be used according to the present invention are copolymers containing 80 to 95% by weight of methyl methacrylate and 5 to 20%, preferably 8 to 15%, by weight of an amine-type compound quaternised by an alkylating agent.

The quaternary amine-type compounds can have the general formula:

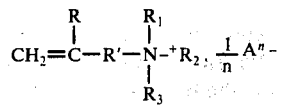

in which:
R represents a hydrogen atom or a —CH$_3$ radical, R' represents a —COOR"— or —CONHR"— radical, R" being a divalent hydrocarbon radical containing 1 to 4 carbon atoms, and preferably ethylene.
R$_1$, R$_2$ and R$_3$ represent hydrocarbon radicals preferably containing 1 to 4 carbon atoms, such as CH$_3$,
A$^{n-}$ represents a stable anion, of valency $n$, of a strong acid such as trichloroacetic, hydriodic, hydrobromic, hydrochloric, sulphuric, phosphoric, phosphonic (for example, phenylphosphonic acid, sulphonic acids (for example, benzene ulphonic and p-toluenesulphonic acids), and the like, and
$n$ an integer greater than or equal to 1.

Amongst the compounds which are most suitable for the preparation of the copolymer B, there may be mentioned, for example, N-trimethylethylammonium methacrylate paratoluenesulphonate or methylsulphate.

The quaternised amine-type compounds can also have the general formula:

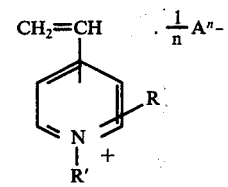

in which R represents a CH$_3$ radical or a hydrogen atom and R' a hydrocarbon radical containing 1 to 4 carbon atoms, preferably a —CH$_3$ radical, and A$^{n-}$ and $n$ have the same meaning as above.

Amongst the compounds corresponding to the above formula which can advantageously be used for copolymerisation with methyl methacrylate, there may be mentioned N-methyl-2-methyl-5-vinyl-pyridinium para-toluenesulphonate.

The compounds which possess a quaternary ammonium group and are copolymerisable with methyl methacrylate are prepared by quaternization of the corresponding unsaturated compound by means of an alkylating agent dissolved in a solvent or a solvent mixture for the said agent, or in emulsion in the case where the alkylating agent is not soluble, at a temperature between ambient temperature and a temperature approaching the boiling point of the reaction medium used, for a period of at least 15 minutes and generally between 15 minutes and 1 hour.

Amongst the alkylating agents which can be used, there may be mentioned esters of strong acids such as trichloracetates, iodides, bromides and chlorides, like allyl or benzyl chloride and methyl iodide, and sulphates, phosphonates and sulphonates like methyl para-toluenesulphonate and the like.

The relative proportions of the polymers (A) and (B) can vary within wide limits depending on the proportion of base comonomer in the copolymer (B) and depending on the degree of dyeing affinity desired. In order to achieve sufficient dyeing affinity for acid dyestuffs, it is necessary for the mixture of the two polymers to contain at least 40 to 50, and preferably at least 50, base milliequivalents derived from the quaternary ammonium moiety per kg of polymer. Furthermore, it is generally preferred not to exceed a proportion of 20% of polymer (B) in the mixture in order that the mixture shall retain its good properties of non-inflammability.

The mixture of the polymers (A) and (B) according to the invention is sufficiently compatible to make it possible, on dissolution, to obtain a solution which is sufficiently homogeneous to permit easy spinning while producing articles with good properties. In fact, a danger always exists when spinning two polymers of different nature, namely the possible incompatibility of the two polymers which can either have a detrimental effect on the spinning process or can give rise to products of redhibitory quality.

The invention also relates to a process for the preparation of filaments, fibers and films from the mixture of the polymers (A) and (B). Filaments and fibers can be prepared by wet, dry or semi-melt spinning. In the first two cases, the mixture of the two polymers is first dissolved in an aprotic polar organic solvent such a dimethylformamide, dimethylacetamide, N-methyl-pyrrolidone, dimethylsulphoxide and the like. The concentration of polymer in the spinning solution can vary within rather wide limits, but preferably lies between, for example, 20 and 30% by weight.

With regard to semi-melt spinning, it is possible to use the same solvents as those mentioned above, but it is generally preferred to use dimethylacetamide or N-methyl-pyrrolidone because of their high boiling point. In this case, the mixture to be spun contains at least 50% by weight of polymer mixture and preferably approximately 60 to 70% by weight of this polymer mixture per 30 to 40% of solvent.

Wet spinning is carried out in a coagulating bath containing at least 30% by weight of solvent for the polymer mixture. In order to obtain filaments of good homogeneity which possess satisfactory mechanical properties, it is preferred that the concentration of solvent should be between 50 and 70% or, preferably, that it should be at least approximately 60%.

Dry spinning is carried out by extruding the solution in air at a sufficiently high temperature to enable a large amount of solvent to evaporate.

In semi-melt spinning, the mixture is extruded at a temperature of the order of 150° to 200° C depending on the solvent used, through a spinneret, and is solidified in air at ambient temperature.

Regardless of the method by which they are spun, the filaments are then stretched either before or after washing, or even in two or more stages before and after washing. Stretching can be effected in accordance with any known process, in air or in water, on a heated plate or rollers, at a temperature between ambient temperature and 150° C, depending on the stretching process or processes used. Stretching is effected in an overall ratio of 5 to 7.

The filaments are then washed in accordance with any process known to those skilled in the art, generally at ambient temperature, dried in the usual way, and optionally heat-treated under tension or in the relaxed state.

The mixtures of the two polymers can also be converted to films in accordance with any process known to those skilled in the art.

The filaments thus prepared possess good mechanical properties which enable them to be used both in the textile field and in the industrial field. They can be dyed in numerous shades, easily and economically, using acid and metal-containing dyestuffs.

The following examples, in which the parts and percentages are expressed by weight, are given by way of illustration and without implying any limitation upon the invention.

In these examples, the specific viscosity is measured using a solution of polymer of concentration 2 g/l at 25° C, in dimethylformamide, and the dyestuffs are identified by their C.I. reference taken from "Colour Index", 1971 edition.

The "Loi" index of textile samples is measured by means of a method based on ASTM Standard Specification B 2863-70 employed in the U.S.A., relating to the measurement of the Loi index of plastic test pieces, but using textile samples requiring a rectangular frame of internal dimensions 5 × 16 cm.

The light fastness test using the Xenotest is the subject of ratified French Standard Specification NF G 07,067 (ISO Recommendation R 105/V — 1969).

The test relating to fastness to washing at 60° C is the subject of French Standard Specification NF G 07,015 (ISO Recommendation 105/IV — 1968).

EXAMPLE 1

186 parts of methyl para-toluensulphonate and 50 parts of acetone are introduced dropwise, by means of a dropping funnel, with stirring, at a temperature below 25° C, into a reactor containing a solution of 157 parts of N-dimethylaminoethyl methacrylate diluted with 50 parts of acetone.

The quaternized product precipitates; it is recovered, rinsed, dried and then recrystallized from ether.

26 parts of the product obtained above, 154 parts of methyl methacrylate, 420 parts of dimethylformamide and 0.1%, relative to the weight of monomers, of azo-bis-isobutyro-nitrile are then introduced into a reactor. Polymerisation is carried out with stirring, under nitrogen, for 20 hours at 60° C.

The polymer obtained is precipitated in water: 120 parts of polymer, of specific viscosity 0.96, containing 275 base milliequivalents derived from the quaternary moiety per kg, are obtained.

A spinning solution of concentration 27.6%, in dimethylformamide is prepared which contains:
  20 parts of the copolymer prepared above, containing 91% of methyl methacrylate and 9% of N-trimethylethylammonium methacrylate p-toluenesulphonate, and
  80 parts of poly(vinylidene fluoride), of melt flow index 190.

This solution is heated to 60° C and is extruded through a spinneret with 64 orifices of diameter 0.07 mm into a coagulating bath, kept at 20° C, containing 57 parts of dimethylformamide and 43 parts of water.

As they issue from the coagulating bath, the filaments are first stretched in air at ambient temperature at a ratio of 3.4 and then in boiling water at a ratio of 1.7, washed with water counter-currently at ordinary temperature, and finally dried on rollers kept at 120° C.

The filaments obtained possess the following properties:

| | |
|---|---|
| Dry tenacity | 16 g/tex |
| Elongation | 20% |
| Base milliequivalents per kg of polymer | 55 |
| "Loi" index | 28 |

Dyeing tests were carried out on filaments made of poly(vinylidene fluoride) (A) alone, prepared under the same conditions as the filaments based on the mixture of polymers (A) and (B) on the filaments prepared above.

Dyeing conditions: 1 hour at 105° C in a bath ratio of 1/50 (1 g of material per 50 cm³ of bath), in the presence of 1 cm³/liter of 80% strength formic acid, after desizing and vaporising for 15 minutes at 110° C, the dye bath containing 2% of dyestuff relative to the weight of material. After dyeing, the filaments are rinsed for 15 minutes at 70° C using a bath containing cm³/l of oxyethylated cetyl alcohol and 1 g/l of Na$_2$CO$_3$.

The results are given in the table below:

| Dyestuff used | | Yield | Light Fastness | Fastness to Washing at 60° C |
|---|---|---|---|---|
| Acid Blue, C.I. 40 (No. 62,125) | Control filament | 0 | | |
| | Filaments according to the invention | 4 | 7 | 5/5 |
| Acid Black, C.I. 60 (No. 18,165) | Control filament | 0 | | |
| | Filaments according to the invention | 3 | 6-7 | 5/5 |
| Orange, C.I. 92 (No. 12,714) | Control filament | 0 | | |
| | Filaments according to the invention | 4 | 7 | 5/4-5 |
| Orange, C.I. 19 (No. 19,690) | Control filament | 0 | | |
| | Filaments according to the invention | 3-4 | 3 | 5/5 |

EXAMPLE 2

119 parts of 2-methyl-5-vinyl-pyridine and 40 parts of acetone are introduced dropwise, by means of a dropping funnel, into a reactor containing 186 parts of methyl para-toluenesulphonate dissolved in 40 parts of acetone, at a temperature of 25° C, with stirring.

At the end of the addition, quaternized 2-methyl-5-pyridine precipitates and the product thus obtained is filtered off, rinsed with acetone and dried.

36 parts of the product obtained above, 120 parts of methyl methacrylate, 350 parts of dimethylformamide and 0.1%, relative to the weight of monomer, of azo-bis-isobutyro-nitrile are introduced into a reactor.

After polymerisation for 20 hours at 60° C, under nitrogen, 120 parts of copolymer, of specific viscosity 0.57, containing 347 base milliequivalents per kg, are obtained.

A spinning solution, in which the concentration of polymers is 26.45% is prepared containing:
  85 parts of poly(vinylidene fluoride), of melt flow index 190, and
  15 parts of the copolymer prepared above, consisting of:
    88% of methyl methacrylate and
    12% of N-methyl-2-methyl-5-vinyl-pyridinium p-toluenesulphonate This solution is spun under the same conditions as in the preceding example and the filaments obtained are stretched successively in air at a ratio of 3.4 and in boiling water at a ratio of 1.4, and are then washed and dried as in Example 1.

The filaments obtained possess the following properties:

| | |
|---|---|
| Dry tenacity | 16 g/tex |
| Elongation | 23% |
| Base milliequivalents per kg of polymer | 61 |
| "Loi" index | 29 |

In the same way as in Example 1, comparison dyeing tests were carried out on filaments made from the polymer (A) and filaments made from the mixture of polymers prepared above, the dyeing conditions being exactly the same as in Example 1.

The results are given in the table below.

| Dyestuff Used | | Yield | Light Fastness | Fastness to Washing at 60° C |
|---|---|---|---|---|
| Acid Blue, C.I. 62 No. 62,045 | Control filament | 0 | | |
| | Filament according to the invention | 5 | 5-6R | 5/4 |
| Acid Blue, C.I. 120 No. 26,400 | Control filament | 0 | | |
| | Filament according to the invention | 5 | 3-4 | 5/4-5 |
| Acid Blue, C.I. 80 No. 61,585 | Control filament | 0 | | |
| | Filament according to the invention | 2 | 4-5 | 5/5 |
| Acid Violet, C.I. 78 No. 12,205 | Control filament | 0 | | |
| | Filament according to the invention | 4 | 6 | 5/4-5 |

What is claimed is:

1. Shaped articles based on poly(vinylidene fluoride) possessing good dyeing affinity for acid and metal-containing dyestuffs, comprising a mixture of a vinylidene fluoride homopolymer (A) and a copolymer (B) containing 80 to 95% by weight of methyl methacrylate and 5 to 20% by weight of a compound which contains a quaternary ammonium group and is copolymerisable with methyl methacrylate.

2. Shaped articles according to claim 1, wherein the copolymer (B) contains 85 to 92% by weight of methyl methacrylate and 8 to 15% by weight of the compound containing a quaternary ammonium group.

3. Shaped articles according to claim 2, wherein the compound containing a quaternary ammonium group has the formula:

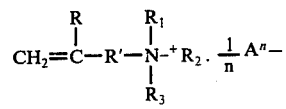

in which:

R: represents a hydrogen atom or a methyl radical,

R': represents a —COOR"— or —CONHR"— radical in which R" is a divalent hydrocarbon radical containing 1 to 4 carbon atoms, $R_1$, $R_2$ and $R_3$ represent hydrocarbon radicals containing 1 to 4 carbon atoms, and $A^{n-}$ represents a stable anion, of valency $n$, of a strong acid, and n is an integer greater than or equal to 1.

4. Shaped articles according to claim 2, wherein the compound containing a quaternary ammonium group has the formula:

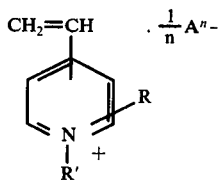

in which R represents a —$CH_3$ radical or a hydrogen atom, R' a hydrocarbon radical containing 1 to 4 carbon atoms, $A^{n-}$ a stable anion, of valency $n$, of a strong acid, and n an integer greater than or equal to 1.

5. Shaped articles according to claim 3, wherein the monomer copolymerised with methyl methacrylate is N-trimethylethylammonium methacrylate para-toluenesulphonate.

6. Shaped articles according to claim 4, wherein the monomer copolymerised with methyl methacrylate is N-methyl-2-methyl-5-vinyl-pyridinium para-toluenesulphonate.

7. Shaped articles according to claim 1, wherein the poly)vinylidene fluoride) possesses a melt flow index of at least 10, measured at 250° C.

8. Shaped articles according to claim 1, wherein the mixture of the two polymers contains at least 40 base milliequivalents per kg.

* * * * *